United States Patent [19]

Ohsaka et al.

[11] 4,258,309

[45] Mar. 24, 1981

[54] SWITCHING TYPE POWER SUPPLY CIRCUIT

[75] Inventors: Yukio Ohsaka; Takaharu Ikeda, both of Tokyo, Japan

[73] Assignee: Sony Corporation, Tokyo, Japan

[21] Appl. No.: 54,790

[22] Filed: Jul. 5, 1979

[30] Foreign Application Priority Data

Jul. 7, 1978 [JP] Japan .................................. 53-83445

[51] Int. Cl.³ .......................... G05F 1/58; H04N 3/18
[52] U.S. Cl. ..................................... 323/287; 323/271
[58] Field of Search ...................... 323/17, DIG. 1, 20, 323/9

[56] References Cited

U.S. PATENT DOCUMENTS

| | | | |
|---|---|---|---|
| 3,781,653 | 12/1973 | Marini | 323/DIG. 1 |
| 3,819,986 | 6/1974 | Fukuoka | 323/DIG. 1 |
| 3,931,567 | 1/1976 | Kostecki | 323/DIG. 1 |
| 4,054,843 | 10/1977 | Hamada | 323/DIG. 1 |
| 4,100,595 | 7/1978 | Pollmeier | 323/DIG. 1 |

Primary Examiner—A. D. Pellinen
Attorney, Agent, or Firm—Lewis H. Eslinger; Alvin Sinderbrand

[57] ABSTRACT

A switching type power supply circuit having a series connection of a switching element and an inductance element connected between output terminals of a DC voltage source, a series connection of a fly-wheel diode and a detecting resistor connected between the junction of the switching element and inductance element and the ground, and a capacitor connected between the junction of the inductance element and the DC voltage source and the ground, in which when a voltage across the detecting resistor exceeds a predetermined level, the supply of the switching pulse to the switching element is stopped to render the switching element OFF.

2 Claims, 3 Drawing Figures

SWITCHING TYPE POWER SUPPLY CIRCUIT

BACKGROUND OF THE INVENTION

1. Field of the Invention

The present invention relates generally to a switching type power supply circuit suitable for use with a power supply circuit of a television receiver, and is directed more particularly to a switching type power supply circuit which will restrict the output current upon an over load of its switching element, such as might occur if the load of the power supply circuit were short-circuited, and also prevent the input voltage of the power supply circuit from being applied directly to its load circuit if its a switching element is short-circuited.

2. Description of the Prior Art

In the art two basic types of switching power supply circuits are known the parallel type switching power supply circuit, in which the primary winding of a transformer and a switching element are connected in series across a DC input voltage and in which a rectifying circuit is connected to the secondary winding of the transformer, and the series type switching power supply circuit, in which a switching element is connected in series with a choke coil across a DC voltage supply. An advantage of the parallel type power supply circuit, such an advantage is obtained that an output voltage higher than the input voltage can be generated in accordance with the winding number ratio of the transformer, but such a defect is accompanied that its efficiency is low and it requires the transformer.

An example of the prior art series type power supply circuit will be now described with reference to FIG. 1. This example consists of a diode bridge 2 for rectification which is connected to an AC power source 1, a smoothing capacitor 3 which is connected between output terminals 2a and 2b of the diode bridge 2, a transistor 4 which is supplied at its collector with the rectified output from the diode bridge 2 through the capacitor 3, a choke coil 6 which is inserted between the emitter of the transistor 4 and an output terminal 5, a fly-wheel (current holding) diode 7 connected between one end of the choke coil 6 and the ground, and a capacitor 8 connected between the other end of the choke coil 6 and the ground. In the prior art circuit of FIG. 1, the transistor 4 achieves the switching operation in response to the duty factor of a switching pulse applied thereto through a drive transformer 9, and the input voltage is reduced by the ratio in accordance with the duty factor to produce an output voltage which is applied to a load circuit 10 connected to the output terminal 5.

The above prior art series type power supply circuit has such an advantage that it is good in efficiency as compared with the parallel type power supply circuit and the choke coil 6 of a small size and hence an inexpensive one is sufficient, but can not be free from such a disadvantage that when the transistor 4 is damaged and its collector-emitter path is short-circuited, the input voltage is, as it is, applied to the load circuit 10, which is very dangerous.

If the above is taken into account, such a power supply circuit as shown in FIG. 2 may be considered in which reference numerals same as those used in FIG. 1 designate the same elements. In case of FIG. 2, the output terminal 2b of the diode bridge 2, which connected to the collector of the transistor 4, that is, output terminal 2b, is not grounded, but instead is connected to the output terminal 5.

With the circuit of FIG. 2, during the time period when the transistor 4 is ON, current flows through the transistor 4 and choke coil 6 and energy is stored in the choke coil 6. Thus, during the time period when the transistor is OFF, current flows through fly-wheel diode 7 and the choke coil 6 to capacitor 8 the energy previously stored in the choke coil 6. Accordingly, the capacitor 8 is charged up and power is applied to the load circuit 10. The output voltage appearing at the output terminal 5 is a voltage provided by reducing the input voltage according to the duty factor of the switching pulse applied to the transistor 4. In the event that the transistor 4 is damaged and its collector-emitter path is short-circuited, both ends of the smoothing capacitor 3 are short-circuited, and hence the input voltage is not applied to the load circuit 10. If a fuse is inserted between the AC power source 1 and the diode bridge 2 in FIG. 2, the fuse would melt as a result of such a short circuit and protect the load circuit.

OBJECTS AND SUMMARY OF THE INVENTION

Accordingly, it is an object of the present invention to provide a novel switching type power supply circuit free from the defects inherent in the prior art.

It is another object of the invention to provide a switching type power supply circuit suitable for use with the high voltage generator of a television receiver.

It is a further object of the invention to provide a switching type power supply circuit which can produce a stable output voltage.

It is a further object of the invention to provide a switching type power supply circuit high in efficiency, cheap in price, small in size, and also high in reliability.

According to an aspect of the present invention there is provided a switching type power supply circuit which comprises a DC voltage source having a pair of output terminals, a series connection of a switching element and an inductance element connected between the pair of output terminals of the DC voltage source, a series connection of a fly-wheel diode and a detecting resistor connected between the junction of the switching element and inductance element and a source of reference potential, a capacitor connected between the junction of the inductance element and the DC voltage source and a source of reference potential, a pulse generator for supplying a switching pulse to the switching element, and a control circuit connected to the switching pulse generator and to the detecting resistor for stopping the supply of the switching pulse to the switching element so as to turn it OFF when a voltage across the detecting resistor exceeds a predetermined level.

The other objects, features and advantages of the present invention will become apparent from the following description taken in conjunction with the accompanying drawings in which similar references designate similar elements.

DESCRIPTION OF THE PREFERRED EMBODIMENT

Figure 1:
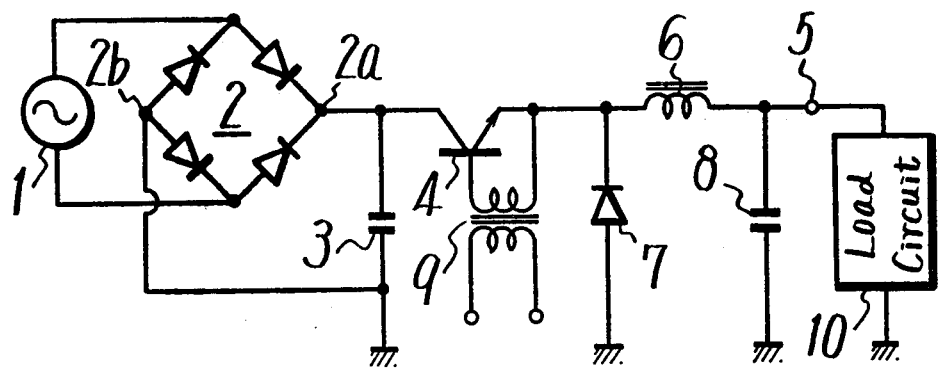
FIG. 1 is a connection diagram showing an example of the prior art switching type power supply circuit.
Figure 2:
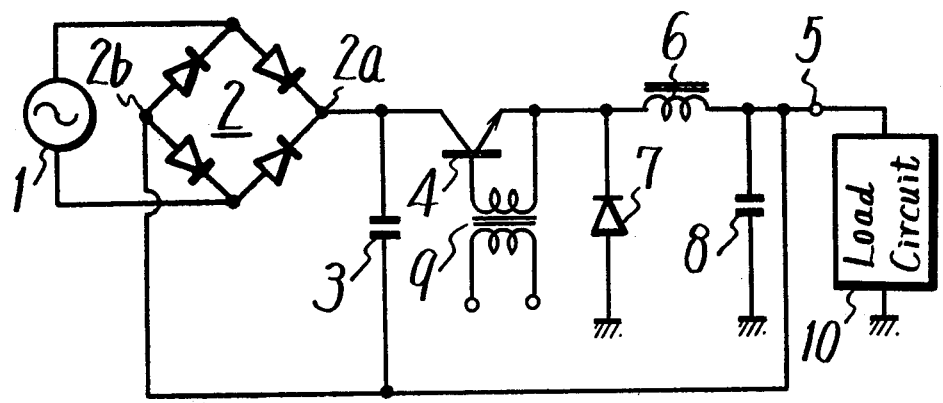
FIG. 2 is a connection diagram showing a switching type power supply circuit which is used to help explain the present invention.
Figure 3:
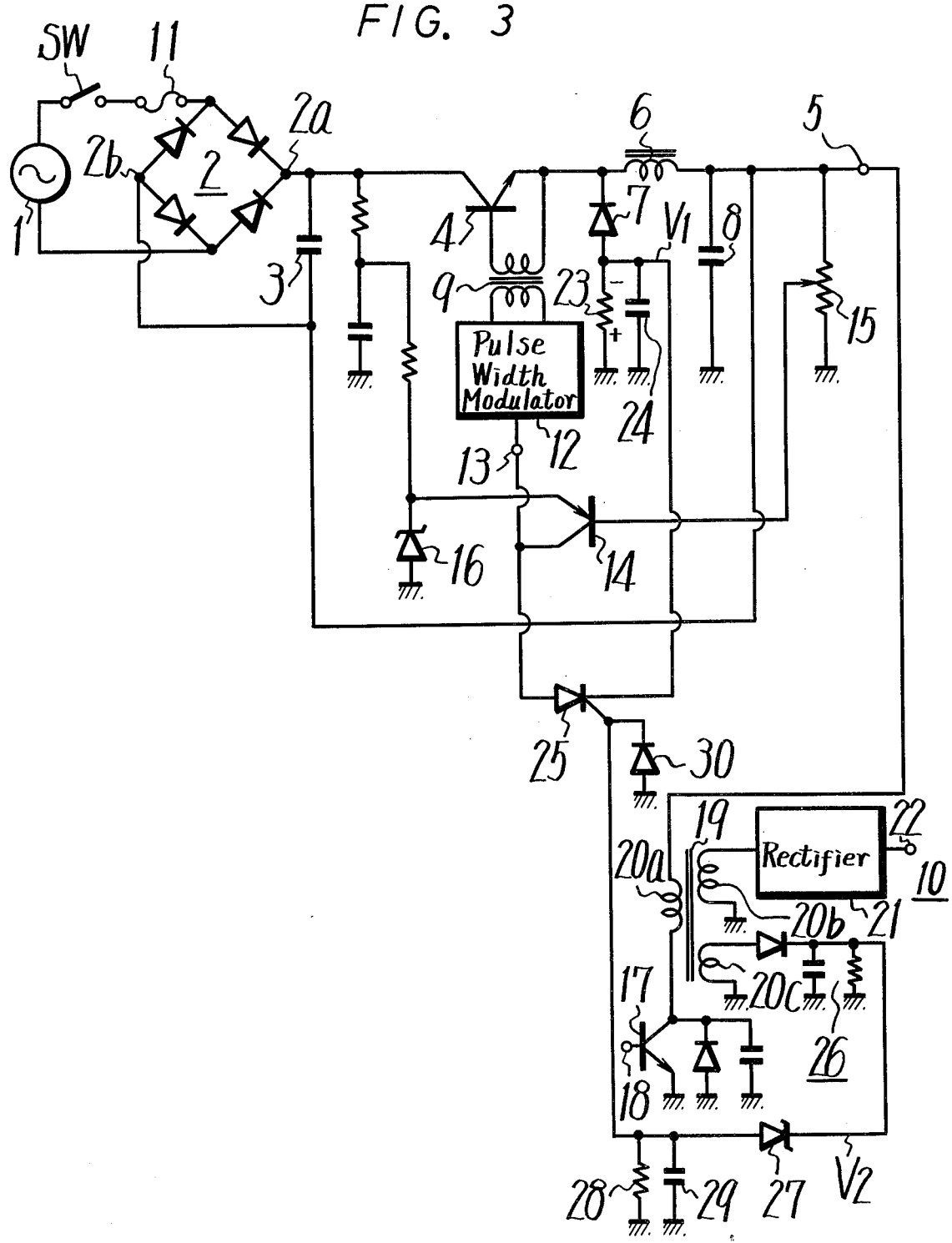
FIG. 3 is a connection diagram showing an example of a switching type power supply circuit according to the present invention.

Turning to FIG. 3, an embodiment of the present invention will be described. In the example of the invention shown in FIG. 3, the present invention is adapted to a power supply circuit for a high voltage generating circuit of a television receiver. In FIG. 3 the same reference numerals and letters as those used in FIGS. 1 and 2 are used to designate the same elements.

In FIG. 3, reference letter SW represents a power switch connected between the AC power source 1 and the diode bridge 2, and the reference number 11 represents a fuse connected between the power switch SW and the diode bridge 2, respectively. In the example of the invention shown in FIG. 3, the switching pulse for the transistor 4 is generated from a pulse width modulating circuit or modulator 12 connected to the drive transformer 9. The pulse width modulator 12 comprises, for example, a monostable multivibrator with a control terminal 13. When a control voltage applied to the control terminal 13 of the monostable multivibrator 12 increases, the duty factor of the switching pulse becomes small and the output voltage decreases. While, when the control voltage applied to the control terminal 13 decreases, contrary to the former case, the output voltage increases. And, when the control terminal 13 is grounded, the generation of the switching pulse is stopped. In order to produce the control voltage, a PNP-type transistor 14 is provided to perform a voltage comparison. A variable resistor 15 is connected between the output terminal 5 and the ground, and a Zener diode 16 is connected between the output terminal 2a of the diode bridge 2 and the ground. Then, a detected voltage appearing at the movable piece of the variable resistor 15 is applied to the base of the transistor 14, a reference voltage provided by the Zener diode 16 from the input voltage is applied to the emitter of the transistor 14, and the voltage appearing at the collector of the transistor 14 becomes the control voltage which is applied to the control terminal 13. Thus, as the detected voltage increases or decreases, the control voltage increases or decreases, correspondingly. It is assumed by way of example that when the duty factor of the switching pulse is 50%, a desired or standard output can be produced. Under such an assumption, when the output voltage becomes lower than the standard voltage, the control voltage fed to the control terminal 13 becomes lower with the result that the duty factor of the switching pulse generated from the pulse width modulator 12 becomes greater than 50% and hence the output voltage increases. By such a feedback control the output voltage can be stabilized.

In the example of FIG. 3, the high voltage generating circuit of a television receiver is connected to the output terminal 5 as the load circuit 10. The high voltage generating circuit 10 has an output transistor 17 which is supplied at its base with a switching pulse of the horizontal period through a terminal 18. A primary winding 20a of a fly-back transformer 19 is connected between the collector of the transistor 17 and the output terminal 5, and a high voltage rectifying circuit or rectifier 21 is connected to a secondary winding 20b of the fly-back transformer 19. At an output terminal 22 led out from the high voltage rectifier 21 there is obtained a high voltage.

In the example of the invention shown in FIG. 3, a parallel circuit comprising a detecting resistor 23, across which a detected voltage V1 is generated, and a capacitor 24 is connected between the anode of the fly-wheel diode 7 and the ground. The connection point between this parallel circuit and the fly-wheel diode 7 is connected to the cathode of a thyristor 25, whose anode is connected to the control terminal 13 of the pulse width modulator 12. Further, a detecting winding 20c is provided at the secondary side of the fly-back transformer 19, and a rectifying circuit or rectifier 26 is connected to the detecting winding 20c to rectify the pulse voltage which is induced in the detecting winding. The level of this pulse voltage corresponds to the level of the pulse induced in the secondary winding 20b of the fly-back transformer 19, and hence this pulse voltage provides a detected voltage V2 which is applied to the cathode of a Zener diode 27, which has its anode connected to the gate of the thyristor 25. Between the gate of the thyristor 25 and the ground there is inserted a resistor 28 and a capacitor 29 connected in parallel. Further, there is provided a diode 30 which has its anode connected to the ground and its cathode connected to the gate of the thyristor 25.

The thyristor 25 is used for protecting the circuit. That is, upon an abnormal state, the thyristor 25 turns ON to ground the control terminal 13 therethrough, with the result that the pulse width modulator 12 stops the generation of the switching pulse, and hence no output voltage is generated. When the transistor 4 is short-circuited, the output voltage is delivered even if the generation of the switching pulse is stopped. However, in such a case, the fuse 11 melts, as set forth previously, so that the input voltage is not applied to the output terminal 5.

The detected voltage V1 generated across the detecting resistor 23 has the forward polarity for the thyristor 25, as shown in FIG. 3. The peak value of the current, which will generate the above detected output V1 when the transistor 4 is OFF, is in proportion to the peak value of the current flowing through the transistor 4 when it is ON and also substantially proportional to the load current. Accordingly, when the load current increases and the detected voltage V1 exceeds a certain value, the thyristor 25 turns ON and the generation of the switching pulse from the pulse width modulator 12 is stopped to render the transistor OFF. In this case, the gate current of the thyristor 25 flows through the diode 30, and the detected voltage V1 is rectified by the diode 30, and also the holding current, which will hold the turned-ON state of the thyristor 25, flows through the diode 30. Thus, the output voltage is restricted and the transistor 4 is prevented from being damaged upon an overload, such as might result from a short circuit in the load 10. The capacitor 24, connected in parallel with the detecting resistor 23, serves to avoid the above protective operation from being actuated by the current which flows for an instant when the power switch SW is first turned ON.

When the level of the pulse at the secondary side of the fly-back transformer 19 becomes high and the detected voltage V2 exceeds a predetermined value determined by the Zener diode 27, a gate current flows in the thyristor 25. Thus, the thyristor 25 turns ON and the supply of power to the high voltage generating circuit is stopped, as explained above. The time constant circuit consisting of the resistor 28 and capacitor 29 prevents this protective operation from being actuated unless the voltage $V_2$ remains abnormally high for a period of time.

With the circuit of FIG. 3, once the thyristor 25 turns ON, the thyristor 25 does not turn OFF until the power switch SW is turned OFF.

As will be understood from the above description of one embodiment of the present invention, the present invention provides a switching type power supply circuit which is fundamentally of the series type, which can be made to be more efficient than parallel type switching power supply circuits and which requires no tranformer and hence can be made to be both inexpensive and compact in size.

Further, with the invention the transistor 4 and the rest of the power supply circuit can be protected from the occurrence of an overload such as might result from a short circuit in its load. In addition, even if the transistor 4 is damaged and its collector-emitter path is short-circuited, this invention provides means to prevent an input voltage higher than a normalized value from being applied to the load circuit, and hence the circuit of the invention is very high in safety.

Furthermore, the present invention provides simple means for preventing a high voltage generating circuit powered by a switching power supply circuit from producing excessively high voltages, which can cause the generation of X-rays and other undesired results.

Having described a specific preferred embodiment of the invention with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. A switching type power supply circuit for supplying a voltage to an output circuit comprising:

a DC voltage source having a pair of output terminals;

a switching element having an ON and an OFF state and an inductance element connected in series between said pair of output terminals of said DC voltage source so as to form a first junction between said switching element and said inductance element and a second junction between said inductance element and said DC voltge source;

a source of reference potential;

a series connection of a fly-wheel diode and a current detecting resistor connected between said first junction and said source of reference potential;

means for supplying a switching pulse to said switching element;

means for detecting said voltage produced by said output in response to the operation of said inductance element and control means for stopping said supplying of said switching pulse to said switching element so as to turn the latter to said OFF state when a voltage across said detecting resistor exceeds a predetermined level or when the detected voltage produced by said output circuit exceeds a predetermined level, said control means including a thyristor having an anode electrode connected to said means for supplying a switching pulse, a cathode electrode connected to said detecting resistor, and a gate electrode connected to said means for detecting said voltage produced by said output circuit.

2. A switching type power supply circuit according to claim 1, further comprising:

a flyback transformer having a primary winding connected to said second junction with a secondary winding for providing a high voltage output and wherein said means for detecting the voltage produced by said output circuit includes a detecting winding for producting an output which indicates the level of induction in said flyback transformer.

* * * * *